April 6, 1965

R. P. ADAMS 3,176,846

AUTOMATIC STRAINER

Filed Oct. 17, 1961

INVENTOR
RENARD P. ADAMS

BY Shoemaker and Mattare

ATTORNEYS

INVENTOR
RENARD P. ADAMS

BY Shoemaker and Mattare

ATTORNEYS

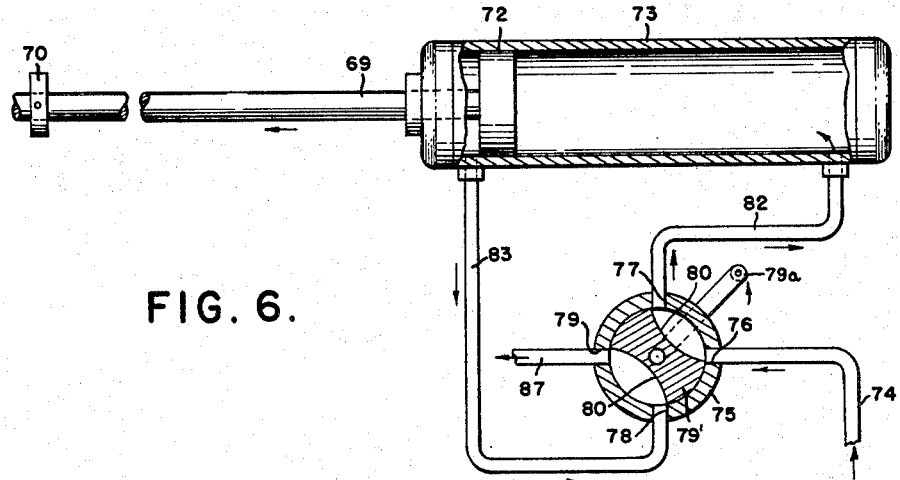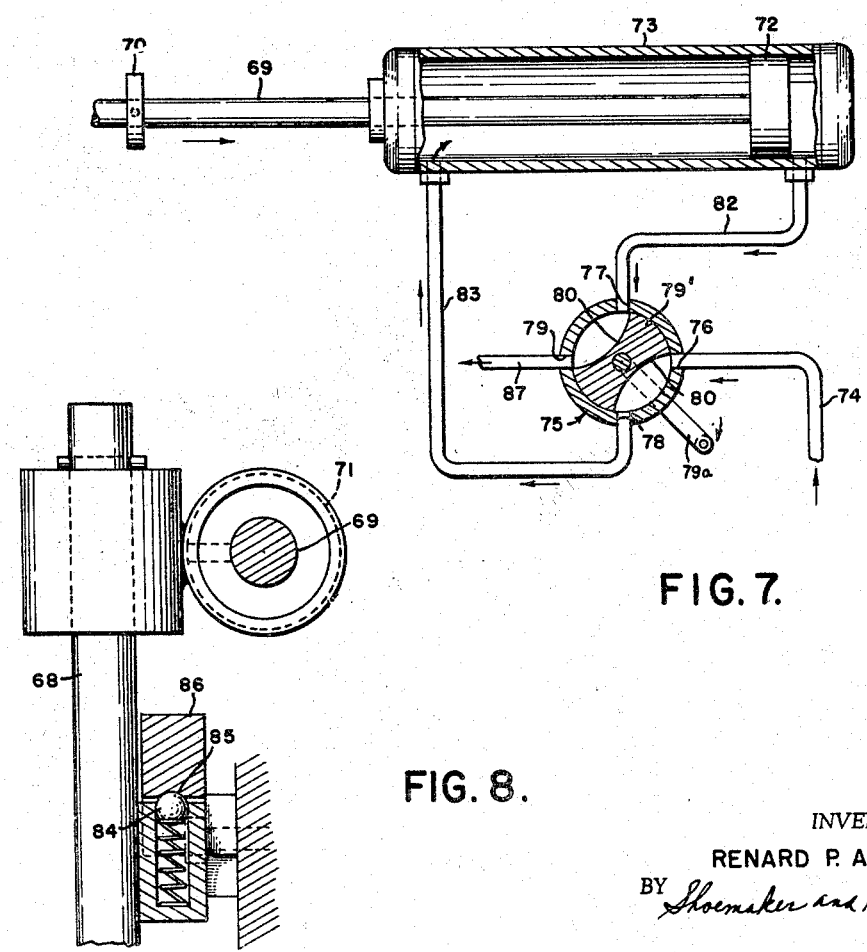

United States Patent Office 3,176,846
Patented Apr. 6, 1965

3,176,846
AUTOMATIC STRAINER
Renard P. Adams, 87 Nottingham Terrace, Buffalo, N.Y.
Filed Oct. 17, 1961, Ser. No. 145,552
1 Claim. (Cl. 210—333)

The present invention relates to an automatic strainer or filtering apparatus, and more particularly to a strainer that can be backwashed.

It is an object of the present invention to provide an automatic strainer or filtering device having a plurality of filter tube means therein, in which one of the individual filter tube means may be backwashed while the device is in operation without necessitating the shutdown of the entire apparatus for the cleaning operation.

It is another object of the present invention to provide a filtering vessel containing a plurality of filter tube means therein in which individual filter tube means may be backwashed using the clean or filtered water as the backwash medium.

It is another object of the present invention to provide a filtering device comprising a plurality of filter tube means with means for operatively connecting backwash means to individual tube means in sequence so that one filter tube at a time may be backwashed without shutting down the entire filtering device.

It is another object of the present invention to provide backwash means operatively associated with a plurality of filter tube means so that individual filter tube means may be backwashed in continuous sequence and in which the backwash means will move from a backwash position to a predetermined intermediate position between adjacent filter tube means during which time no backwash occurs, and thereafter be moved into a backwash position with the next successive filter tube means.

It is another object of the present invention to provide a filtering device provided with backwash means utilizing the clean filtered liquid for the backwash and in which surge means are provided to eliminate any hydraulic shock when the backwashing operation occurs.

It is another object of the present invention to provide backwash means for cleaning individual filter tube means in sequence by the clean filter water passing through the filtering device and in which the backwash means are operated by the liquid pressure flowing through the filtering device.

It is another object of the present invention to provide an automatic strainer or filtering device provided with backwash means that have no movable clearances with respect to the filter tube means embodied therein so that the filtering device may be periodically backwashed and cleaned of contaminants without undue wear and tear upon the filtering device.

It is another object of the present invention to provide backwash means for an automatic strainer apparatus, which backwash means has no relative longitudinal movement or displacement with the tube means, but only relative rotational movement with respect to said tube means.

Various other objects and advantages of the present invention will be readily apparent from the following detailed description when considered in connection with the accompanying drawings forming a part thereof, and in which:

FIG. 4 is an enlarged fragmentary detail view illustrating the closing off or sealing the ends of the filter tubes embodied in the filtering device;

FIG. 6 is a view of the backwash hydraulic actuating means embodied in the invention, disposed in a position to move the hydraulic actuating piston and rod in a direction toward the left end of the hydraulic cylinder;

Figure 2:
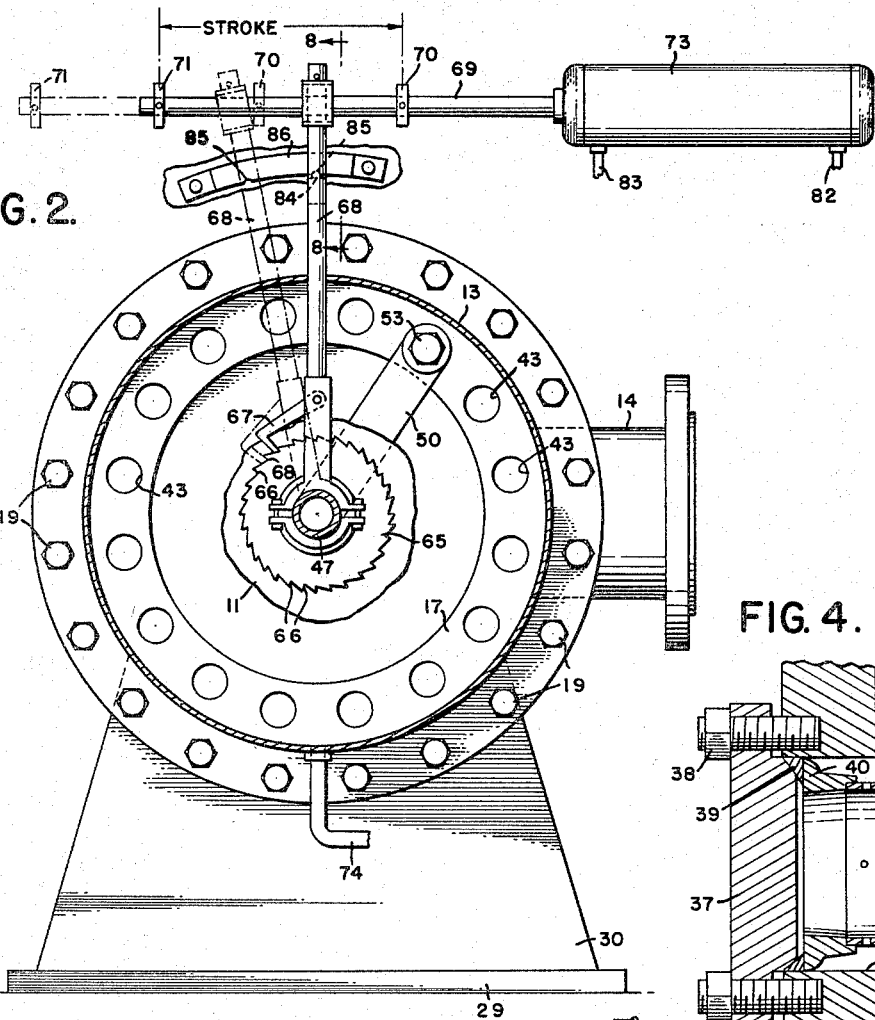
FIG. 2 is a transverse section of the filtering device, taken along lines 2—2 of FIG. 1 but with parts of the hydraulic actuating means for the backwash arm means left out.

FIG. 7 is a view similar to FIG. 6 showing the positioning of the valve means and the flow arrangement for moving the hydraulic actuating piston toward the right end of the hydraulic cylinder, or in the direction opposite to that shown in FIG. 6; and FIG. 8 is an enlarged fragmentary detail side view, taken on line 8—8 of FIG. 2, of the arresting pin means for bringing the backwash arm to rest at a predetermined point.

Referring to the drawings, the reference numeral 10 generally designates a cylindrical strainer or filtering apparatus provided with oppositely disposed dome shaped ends 11 and 12. The device consists of a cylindrical inlet section 13 having an inlet conduit 14 provided in the side wall thereof and a cylindrical discharge section 15 having an outlet conduit 16 disposed in the side wall thereof. The inner open end 17 of inlet section 13 is provided with an annular peripheral flange 18 that is secured to the inner end of section 15 by a plurality of bolt members 19 extending through flange 18 and a corresponding peripheral flange 20 on section 15. A circular gasket member 22 is disposed between the flanges to prevent leakage of liquid therebetween. The flanges 18 and 20 are welded to their respective sections but may be secured thereto by any other suitable means desired.

The opposite end of section 15 is provided with a peripheral flange 22 similar to flange 20 and the flanges 20 and 22 form part of thick circular tube plates 23 and 24 respectively, having a plurality of circumferentially disposed or spaced tube holes or openings 25 therein. Openings 25 are disposed adjacent the circumference of the plates but within the interior of the cylindrical wall of section 15. The outer end of section 15 is closed off or covered by the dome shaped cover 12 having an annular flange 26 secured thereto, which flange and dome are rigidly secured to flange 22 by a plurality of spaced bolts 27 disposed in the flanges. An annular gasket 28 is disposed between the flanges to prevent leakage of liquid therebetween.

The device 10 is supported on a flat base member 29 by four upstanding plates 30 joined to each other along their adjacent edges to form a surge chamber or compartment 31 between the cylindrical vessel and the base. The surge compartment 31 communicates with the interior of section 15 by a vertical conduit or drop pipe 32 extending therein.

Figure 1:
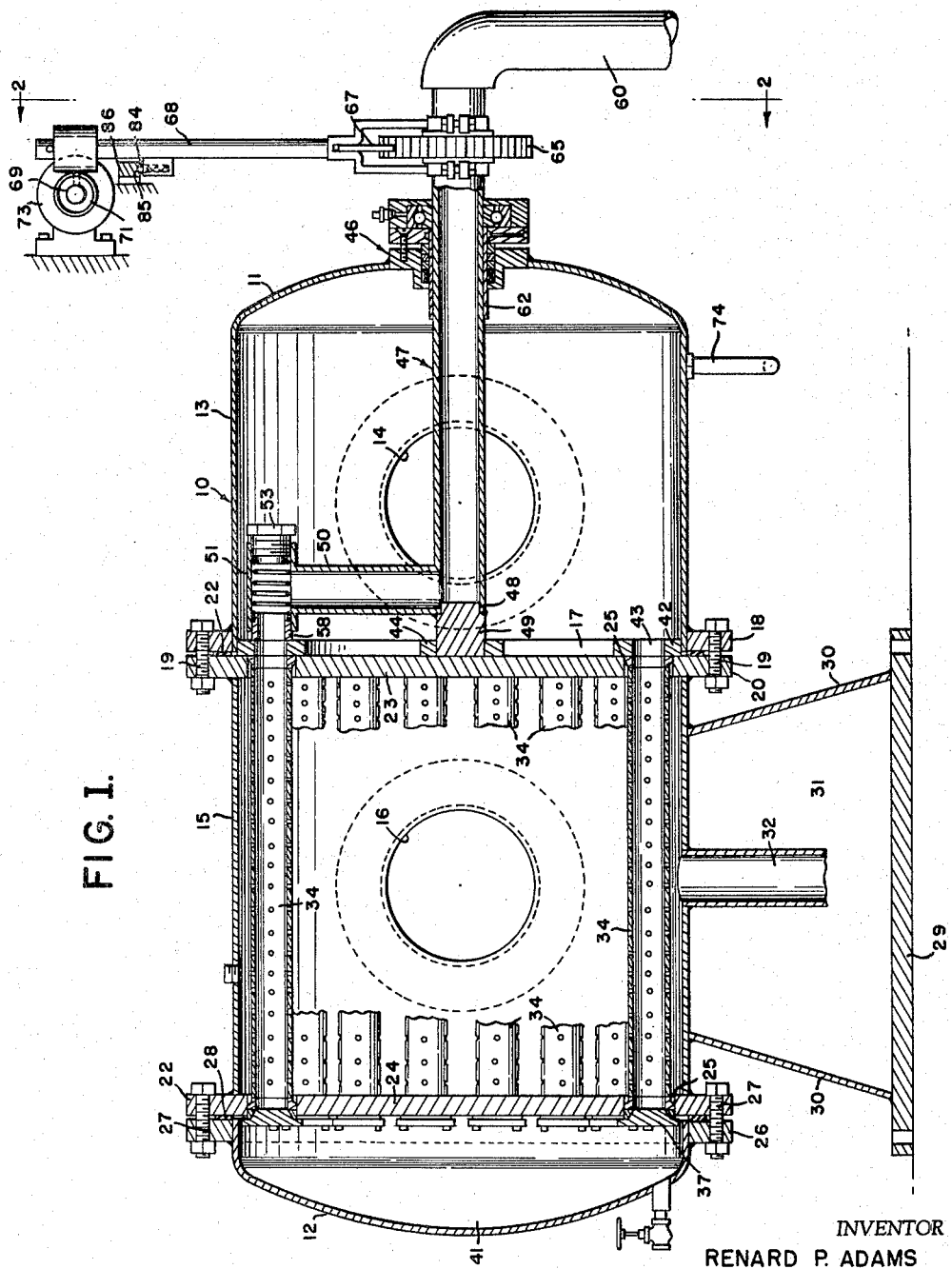
FIG. 1 is a side elevation in section of the straining apparatus of the present invention.

The tube plates 23 and 24 are adapted to receive the opposite ends of a plurality of perforated elongated filtering tubes or strainer members 34 in the circumferential openings 25 provided therein to support the opposite ends of the filter tubes as clearly shown in FIG. 1. The tube plates may have any desired number of openings therein so as to accommodate a varying number of filter tubes, and the openings may further be of any predetermined size to receive tubes of any desired diameter.

The left or outer ends of the tubes 34 are closed off in a fluid tight relationship by flanged individual closure plates 37 (see FIG. 4) which are secured over the openings in plate 24 by bolt members 38. An annular resilient gasket 39 is compressed between the end of the flanged plate and a tube adaptor member 40 to prevent leakage of liquid out of the end of the tube.

The chamber 41 formed by the dome shaped or dished flange head or closure member 12 may be filled with water so that the plate 24 does not come under pressure and acts only as a supporting medium within the device to comply with the ASME code, where necessary. The right ends of tubes 34 are of similar construction or the same as the left ends except they are not blocked or closed off and are provided with a bronze inlet ring 42 that is secured to the inner edge of cylindrical section 13 by welding or the like so as to abut the tube ends to form a liquid tight seal therewith when the bolt members 19 secure flanges 18 and 20 together. The ring 42 has a plurality of inlet ports or openings 43 circumferentially disposed therein in alignment with tubes 34 to permit unfiltered water to flow through the inlet end of the tubes from the inlet conduit 14.

A central sleeve or hub 44 is concentrically welded to the inner side of plate 23 in alignment with a conventional standard thrust and roller bearing with an atmospheric vent gland generally designated 46 secured to a central opening in the end 11 of section 13.

Figure 5:
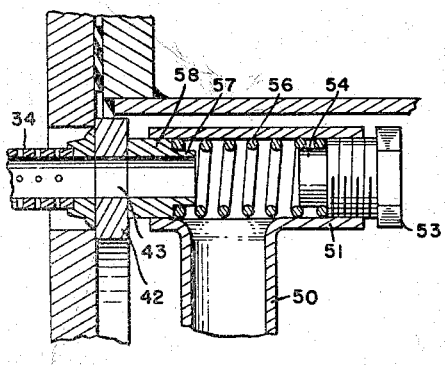
FIG. 5 is an enlarged fragmentary detail view of the rotatable backwash arm member associated with the filtering device and the means for sealing the arm against the end of the filter tubes.

A rotatable L-shaped backwash pipe member 47 has one end extending through and supported in bearing 46 and the opposite end rotatably supported in hub 44. The rotatable member 47 is provided with an opening 48 in the inner end thereof and has a solid cylindrical member 49 secured therein by welding or the like. The opposite end of member 49 is disposed or journalled for rotation within the hub 44. The backwash member 47 is provided with a vertical pipe or arm or leg 50 adjacent its inner end. A short horizontal sleeve 51 is provided on the outer end of leg 50 as shown in FIGS. 1 and 5, which sleeve 51 is adapted to be rotated by member 47 in small increments around the interior circumference of section 13 so that the sleeve may be successively disposed in alignment with one individual tube 34 at a time, as hereinafter described. The sleeve 51 is provided with a removable threaded plug 53 adjacent its outer end, which plug has a reduced inner neck section 54 (see FIG. 5). A compression spring 56 is mounted around and on neck 54 and has its opposite end mounted around and on the reduced neck 57 of an inner sealing sleeve 58 which is slidably disposed in and extends beyond the inner end of sleeve 51 and engages and abuts the bronze ring 42. The biasing spring 56 maintains sleeve 58 in a liquid-tight abutting relationship with ring 42 so that there can be no leakage of water between the ring 42 and the end of sleeve 58. It will be observed that the biasing spring 56 compensates for any uneven surfaces in the bronze ring so that when the rotatable arm 50 is rotated in sequence into alignment with each individual tube 34 in section 15, the sleeve 58 will automatically adjust itself and compensate for any uneven surfaces so that a perfect liquid-tight seal is always provided, because of the floating seal.

The rotatable backwash member 47 has its outer end extending completely through bearing 46 and is rotatably connected to a vertical stationary discharge conduit 60 by well known means, not shown.

Figure 3:
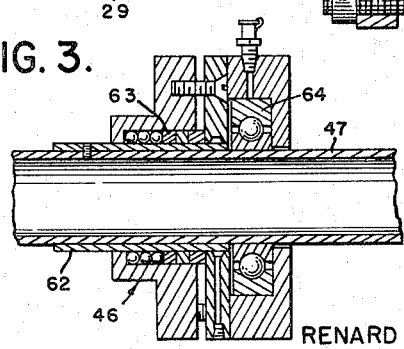
FIG. 3 is an enlarged detail fragmentary view of the radial and thrust bearing disposed in the filtering device of FIG. 1.

The outer end of the rotatable member in passing through end 11 of section 13 is provided with a standard roller and thrust bearing 46 as previously mentioned. Referring to FIG. 3, the bearing 46 is provided with an inner sleeve 62, packing rings 63 and a roller bearing 64 therein so that the member 47 is freely rotatable therein.

A ratchet wheel 65 having a plurality of teeth 66 thereon of predetermined size is fixed or secured on member 47 for driving or rotating the member. The ratchet wheel 65 is disposed on member 47 outside of the filtering device between the bearing 46 and the vertical discharge tube 60, as best seen in FIG. 1.

A pawl 67 is disposed on an elongated cylindrical driving bar or shaft 68, which pawl is adapted to engage the teeth 66 of the ratchet 65 to rotate it in a clockwise direction. Bar 68 is provided with a yoke on its lower end which straddles the ratchet wheel and is rotatably clamped or mounted on member 47 by any well known means. There are twice as many teeth 66 on the ratchet as there are tubes 34 in the filtering device. The drive bar 68 is actuated by a piston rod or plunger 69 having spaced limit stops 70 and 71 fixed thereon to move the rod 68 a predetermined distance or through a predetermined angular displacement, in a reciprocating movement. The plunger 69 is connected to or provided with a reciprocating piston 72 disposed in a cylindrical housing or cylinder 73 (see FIGS. 6 and 7). The cylinder 73 is in communication with the interior of section 13 of the filtering device through a main water supply pipe or conduit 74 communicating therewith, and conduit 74 has a standard barrel type valve (see FIGS. 6 and 7) generally designated 75 connected therewith. The barrel valve 75 is provided with a plurality of spaced openings or ports 76, 77, 78 and 79 therein. A rotatable valve disc 79' having oppositely disposed arcuate side walls or recesses 80 is disposed in the valve 75 so as to place ports 76 and 77 in communication with supply line 74 at one time (see FIG. 6), and ports 78 and 79 in communication with each other when the valve disc is actuated to the position shown in FIG. 6, and to place ports 76 and 78 (see FIG. 7) and ports 77 and 79 in communication with each other at another time when the valve disc 79' is actuated or rotated to the position shown in FIG. 7.

Port 77 communicates with the right end of cylinder 73 and the right side of piston 72 through a pipe 82, while port 78 communicates with the opposite end of cylinder 73 and the opposite side of piston 72 by a conduit 83 (see FIGS. 6 and 7).

The driving bar 68 is provided with a spring loaded rod or detent mechanism 84 (see FIGS. 1, 2 and 8) therein which is adapted to enter spaced recesses 85 (see FIG. 2) disposed in an arcuate member 86 positioned adjacent bar 68. The purpose of the arresting pin mechanism 84 is to cause the movement of the driving arm 68 to come to rest at predetermined points consistent with the cam ratchet teeth 66, as the spring loaded rod or ball 84 pops into a spaced recess 85 of member 86.

In operation, when the filter is normally removing contaminants, dirt and the like from raw or unfiltered water entering the filtering device 15 through inlet 14, the unfiltered water flows through the openings 43 in plate 42 and passes through the inside of tube 34. In flowing through the filtering tubes, the debris and contaminants are filtered from the water and deposited on the inner surface of the tubes with the clean water passing in an inside out direction through the tubes and entering the portion of the filtering device around tubes 34 and thereafter passing through outlet 16 out of the filtering device. A portion of the clean water flows through vertical pipe 32 and down into chamber 31 compressing a portion of air above the water in chamber 31 so as to form a surge chamber therein.

When the inside of the circumferentially disposed tubes 34 becomes contaminated with dirt and the like that has been removed from the water being filtered and it is desired to clean the insides of the tubes 34, the valve disc 79' is rotated to the position shown in FIG. 6 by merely turning or actuating its handle mechanism 79a. This movement of the valve disc places inlet portion 76 in communication with port 77 so that water is flowed through conduit 74 and flows through ports 76 and 77 and conduit 82 into the right end of cylinder 73, thereby moving the piston 72 to the left and moving the piston rod 69 therewith. The movement of the piston rod 69 moves stop 70 to the left from the position shown in solid lines in FIG. 2 to the position indicated in dotted lines therein. It will be noted that the initial movement of stop 70 has no effect on drive bar 68 since it transmits lost motion until stop 70 moves to a position substantially adjacent the position of bar 68 shown in solid lines in FIG. 2. Thereafter, the movement of the stop 70 causes drive bar 68 to move from the position shown in solid lines in FIG. 2, in a counterclockwise direction, to the position indicated in dotted lines therein. Since pawl 67 is fixed to drive bar 68, it too moves from the position shown in solid lines in FIG. 2 to the position indicated in dotted lines therein, and the pawl moves from engagement with one tooth to engagement with the next adjacent tooth to the left thereof. As the piston 72 moves to the left at this time toward the outlet conduit 83, the water from the interior of the cylinder 73 on the left side of piston 72 is discharged through pipe 83 and ports 78 and 79 back to a common bleed off or drain conduit 87.

At this time the rotating arm 50 and the sleeve 51 are disposed in alignment and in communication with the interior of a tube 34 as shown in FIG. 1 or 2 so that the clean water from around the outside of the tubes 34 in section 15 of the filtering vessel flows in an outside-in direction into the interior of the tube 34 and backwashes the dirt and contaminants from the inner surface thereof. The water from this tube is discharged through sleeve 51, arm 50 and the interior of member 47 and is discharged to the atmosphere or to any other desired place through conduit 60.

Thereafter, the valve 79′ is turned or moved by its handle to the position shown in FIG. 7 so that inlet port 76 now communicates with port 78 and port 77 communicates with port 79. The water supply from the interior of the filtering vessel then passes through conduit 74 and ports 76 and 78 and conduit 83 into the left side of the cylinder 73, thereby forcing or moving piston 72 to the right or in a clockwise direction. The movement of piston 72 to the right initially transmits lost motion only and then pulls or pushes plunger 69 with it, and stop 71 will engage plunger 69 which is now in the position indicated in dotted lines in FIG. 2, and move the plunger 69 back to the position shown in solid lines in this figure. Pawl 67 will then rotate ratchet 65 through a short angular distance or increment to the right, thereby rotating member 47 and arms 50 and 51 from a position in alignment with the tube 34 that has just been cleaned, to a position intermediate of this same tube 34 and the next adjacent tube 34 to the right thereof so that the tube 34 is no longer in a backwashing position.

Successive operation of the valve disc in accordance with the cycle just described will then move the sleeve 51 and arm 50 in its next increment in alignment with the next adjacent tube 34, or in alignment with the tube 34 just to the right of the position of arm 50 in FIG. 2 and so on to each successive tube. It will be noted there are twice as many ratchet teeth as filter tubes 34, so that the crank arm and backwash tube move from a backwash position into an intermediate position between tubes during which no reversal of flow takes place. As the next ratchet movement takes place in the arm, the opening of the rotating backwash member comes abreast of the open end of the next strainer tube.

In this manner each individual tube of the filtering device may be cleaned in sequence, while the remaining filtering tubes are in continuous operation so that the filtering device does not have to be shut down or removed from the line for cleaning. When it is desired to discontinue the backwash operation, valve disc 79′ is merely turned to a vertical position to close off or shut port 76.

It will be noted that the provision of the sleeve 51 and the biasing means 56 and sleeve 58 therein provides a floating seal and permits a liquid-tight seal to be maintained at all times between the bronze ring 42 and the end of sleeve 58 and further compensates for any tolerances that may occur in the manufacture of the filtering device. It will also be noted that the water being filtered is utilized to actuate the rotatable backwash member 47 so that no additional apparatus other than the device itself is necessary in this invention.

The provision of the surge tank 31 and the surge compartment formed thereby permits the filtering device to function smoothly because there is no violent hydraulic shock which will take place when an individual filter tube is in the backwash position to the atmosphere. This is because the air space in the upper portion of the surge chamber will expand momentarily discharging the water in the surge tank up through the draft tube 32 into the filtered water compartment 15 to make up for the momentary loss of water which has escaped through the strainer or filter tube that is in the backwash position.

It will also be observed that the present invention provides arresting pin means 85 to cause the movement of the driving arm or bar to come to rest at predetermined points which are consistent with or correspond to the cam ratchet means.

Thus, the present invention provides a novel filtering device in which a rotatable backwash member is provided for cleaning individual filter tubes in sequence and in which floating sealing means are provided for the rotatable member that compensates for any variations in the manufacture of the device, and which sealing means is a static seal and requires no dynamic seal or longitudinal movement of the rotatable arm into and out of engagement with the individual filter tubes to be backwashed and hence eliminates undue wear and tear upon the apparatus which generally accompany such devices having movable clearances.

Inasmuch as various changes may be made in the form, location and relative arrangement of the several parts without departing from the essential characteristics of the invention, it will be understood that the invention is not to be limited except by the scope of the appended claim.

I claim:

Filtering apparatus for removing contaminants from a liquid comprising a filter housing, said housing including an inlet section and a discharge section, an inlet conduit in communication with said inlet section, an outlet conduit in communication with said discharge section, a first tube plate means dividing said inlet section from said outlet section, a second tube plate means in said outlet section, said tube plate means each having holes therein for receiving filter tubes, a plurality of filter tubes disposed within said discharge section and having the opposite ends thereof supported within the holes in each of said tube plate means whereby said tubes may be readily removed individually from the apparatus by sliding a tube out of the holes in the spaced tube plates, means for sealing one end of said tubes, the other end of each of said tubes being open and being in communication with said inlet section when in place within said tube plates, each of said tubes being of substantially cylindrical configuration, said filter tubes having longitudinally spaced discharge means formed therethrough substantially throughout the length thereof and also being circumferentially spaced about the outer periphery thereof for discharging from the inside of said tubes outwardly into said discharge section, said cylindrical filter tubes being circumferentially spaced in substantially parallel relationship with one another and the outer periphery of each tube being spaced a substantial distance from the outer periphery of the adjacent tubes, an annular inlet ring supported in liquid-tight sealing relationship with the open ends of said tubes and having a substantially planar sealing surface, said ring having an inlet port disposed in alignment with the open end of each of said tubes, backwash means, said filter housing including bearing means for movably supporting said backwash means within said inlet section, said backwash means including a longitudinally extending hollow portion rotatably supported by said bearing means and being disposed in the central part of said inlet section and including a radially extending hollow portion which in turn is in communication with a longitudinally extending sleeve portion having an open end disposed adjacent said inlet ring, an inner sealing sleeve slidably disposed within said sleeve portion and extending through said open end into sealing engagement with the sealing surface of said inlet ring, means normally biasing said sealing sleeve into liquid-tight abutting relationship with said sealing surface, said sealing sleeve having a cross sectional dimension substantially equal to that of said tubes and engaging only a very minor portion of said inlet ring at any instant so as to provide a small bearing area with the inlet surface of said inlet ring to afford a good liquid-tight seal at all times, and actuating means connected with said movable backwash means for moving said sealing sleeve from a position in alignment with one of the filter tubes to a position in alignment with the next filter tube whereby the backwash means can be rotated so as to be successively in communication with said filter tubes, said open ends of the filter tubes being circumferentially arranged such that rotation of said backwash means in a circular manner will bring the sealing sleeve into communication with the open ends of the various filter tubes in a sequential manner upon rotation of the backwash means.

References Cited by the Examiner

UNITED STATES PATENTS

| | | | |
|---|---|---|---|
| 320,985 | 6/85 | Thomson | 210—107 |
| 1,878,998 | 9/32 | Akins | 210—107 |
| 2,173,060 | 9/39 | Andrews | 210—333 |
| 2,237,964 | 4/41 | Haught | 210—333 |
| 2,423,172 | 7/47 | Booth | 210—75 X |
| 2,434,427 | 1/48 | Muller | 210—340 X |
| 2,731,107 | 1/56 | Hersey | 55—302 X |
| 2,742,157 | 4/56 | Brunton | 210—333 |
| 2,847,126 | 8/58 | Goodman | 210—411 |
| 2,985,306 | 5/61 | Statzell | 210—340 X |

FOREIGN PATENTS 548,298  10/22  France.

REUBEN FRIEDMAN, *Primary Examiner.*

RONALD R. WEAVER, CHARLES SUKALO,
*Examiners.*